United States Patent [19]

Richards et al.

[11] Patent Number: 5,143,123
[45] Date of Patent: Sep. 1, 1992

[54] CYLINDRICAL ARMOR

[75] Inventors: Marvin K. Richards, Chandler; James W. Ryan, Phoenix, both of Ariz.

[73] Assignee: Simula, Inc., Phoenix, Ariz.

[21] Appl. No.: 395,496

[22] Filed: Aug. 18, 1989

[51] Int. Cl.$^5$ .................... F16L 15/00; F16L 27/00
[52] U.S. Cl. .................... 138/120; 138/155; 138/110; 174/111; 174/68.3
[58] Field of Search ............... 138/120, 96 R, 96 T, 138/110, 155, 150; 174/68 C, 111

[56] References Cited

U.S. PATENT DOCUMENTS

| | | | |
|---|---|---|---|
| 314,995 | 4/1885 | Bullock | 138/120 |
| 338,310 | 3/1886 | Smith | 138/120 |
| 586,113 | 7/1897 | Bott | 138/120 |
| 680,834 | 8/1901 | Bathurst | 138/120 |
| 840,536 | 1/1907 | Weir | 138/120 |
| 899,623 | 9/1908 | Royer | 138/120 |
| 967,901 | 8/1910 | Greenfield | 138/120 |
| 995,453 | 6/1911 | Greenfield | 138/120 |
| 1,034,909 | 8/1912 | Graybill | 138/120 |
| 1,255,577 | 2/1918 | Berry | 138/120 |
| 1,276,117 | 8/1918 | Riebe | 138/120 |
| 1,613,461 | 1/1927 | Johnson | 138/155 |
| 1,822,624 | 9/1931 | Hoeftmann | 138/120 |
| 1,849,193 | 3/1932 | McCurdy | 138/120 |
| 2,136,770 | 11/1938 | Witzenmann | 138/120 |
| 2,515,366 | 7/1950 | Zublin | 138/120 |
| 2,680,358 | 6/1954 | Zublin | 138/120 |
| 3,813,477 | 5/1974 | Fischer | 138/120 |
| 3,908,703 | 9/1975 | Bournazel et al. | 138/120 |
| 4,328,839 | 5/1982 | Lyons et al. | 138/120 |
| 4,396,797 | 8/1983 | Sakuragi et al. | 138/120 |
| 4,516,608 | 5/1985 | Titus et al. | 138/120 X |
| 4,600,037 | 7/1986 | Hatten | 138/120 |
| 4,739,801 | 4/1988 | Kimura et al. | 138/120 |
| 4,862,924 | 9/1989 | Kanao | 138/150 |

Primary Examiner—Harvey C. Hornsby
Assistant Examiner—Patrick F. Brinson
Attorney, Agent, or Firm—Kirkland & Ellis

[57] ABSTRACT

There is provided a cylindrical link and armor for electrical, electronic, or fiber-optic cables, hoses, conduits and the like. The armor comprises links which can either rigidly or flexibly interlock and can support their own weight.

13 Claims, 3 Drawing Sheets

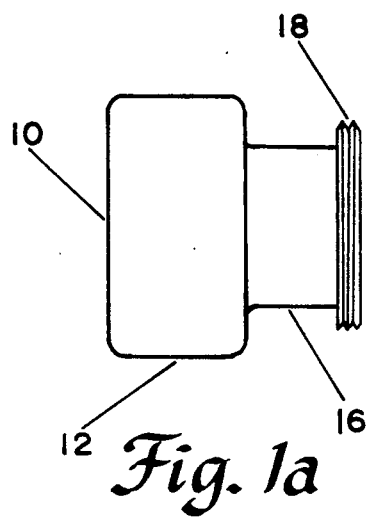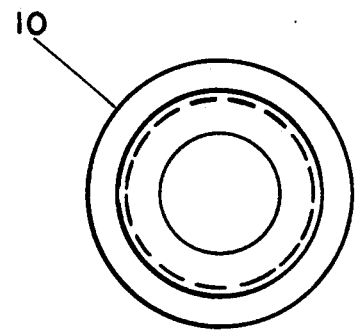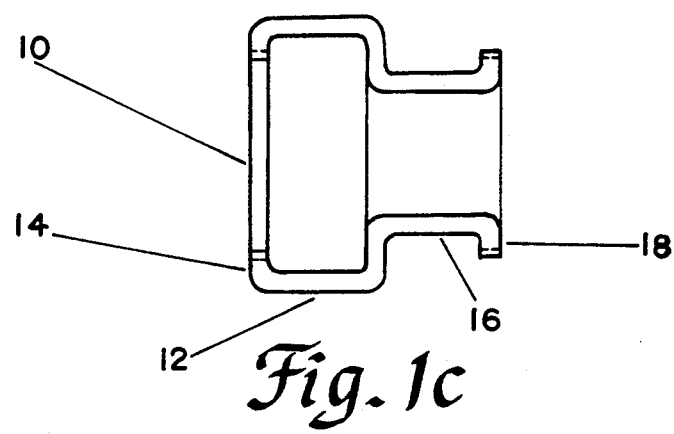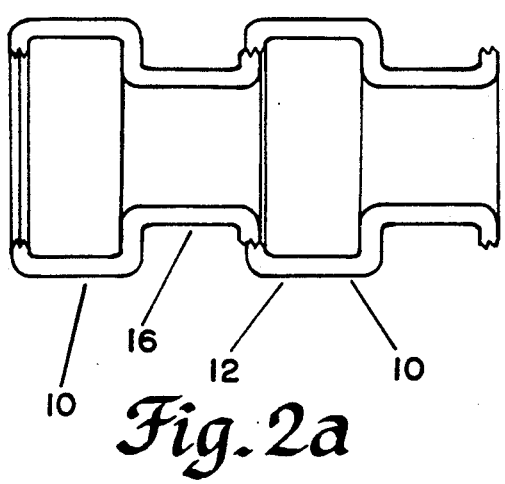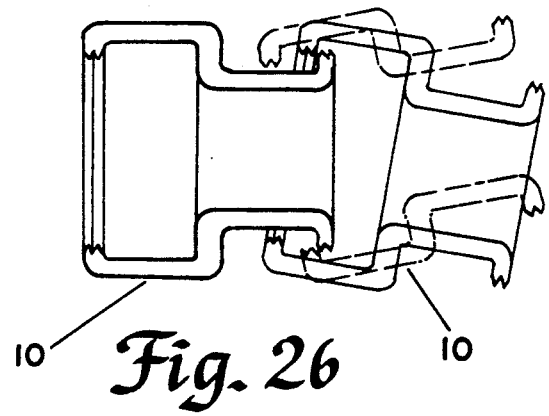

ns a bar wild kulbitzd1,143,123

CYLINDRICAL ARMOR

BACKGROUND

The present invention relates to armor for wires, cables, hoses, pipes, tubing, fibers, and the like.

It is often necessary or desirable to protect tubular objects or conduits such as hoses, cables, and the like from damage which can occur from any of a variety of causes, such as ballistic impacts from projectiles or fragments, while not substantially reducing their flexibility. Accordingly, many types of flexible jacketing or armoring have been developed.

U.S. Pat. No. 840,536 to Weir discloses a flexible armor for hose and piping that includes a plurality of telescoping rings or collars preferably in the form of hollow truncated cones having their ends overlapping and interlocking. For example, the larger end of a collar may be bent to produce an annular bead which engages an annular groove formed in the smaller end of an adjacent collar. Similar armors of the interlocking, shaped-end collar variety are also disclosed in U.S. Pat. No. 1,822,624 to Hoeftmann and U.S. Pat. No. 4,396,797 to Sakuragi et al.

A variation of that type of armoring is disclosed in U.S. Pat. No. 3,813,477 to Fischer in which each of a plurality of pipe sections has an enlarged end portion for receiving the opposite end of an adjacent pipe which has a circumferentially projecting flange. The flange is loosely retained in a channel formed by the enlarged end portion and a ring threaded thereto that may be spot-welded to prevent the ring's loosening. In addition, the first and last pipe section may be connected to an anchoring point. A similar arrangement of interlocking sections using threaded rings is disclosed in U.S. Pat. No. 995,453 to Greenfield.

The above-described devices suffer from significant disadvantages, including difficulty of assembly, insufficiency of protection and flexibility, excess of parts, etc.

SUMMARY

In accordance with the present invention, there is provided an armor comprising a plurality of cylindrical links each of which has ends adapted for mutual engagement. The engagement can be provided by a number of interlocking mechanisms which allow relative motion of adjoining links resulting in flexibility of the armor.

In one embodiment of the invention, a cylindrical link is provided comprising an enlarged end having a threaded flange and a reduced end having a correspondingly threaded flange.

BRIEF DESCRIPTION OF THE DRAWINGS

The several objects and advantages of the present invention will be better understood after a reading of the following detailed description in conjunction with the drawings in which:

FIGS. 1a, 1b, and 1c show side, front, and section views, respectively, of a preferred embodiment of a cylindrical link;

FIGS. 2a and 2b show section views of assembled cylindrical links;

DETAILED DESCRIPTION

Figures 3C, 3D:
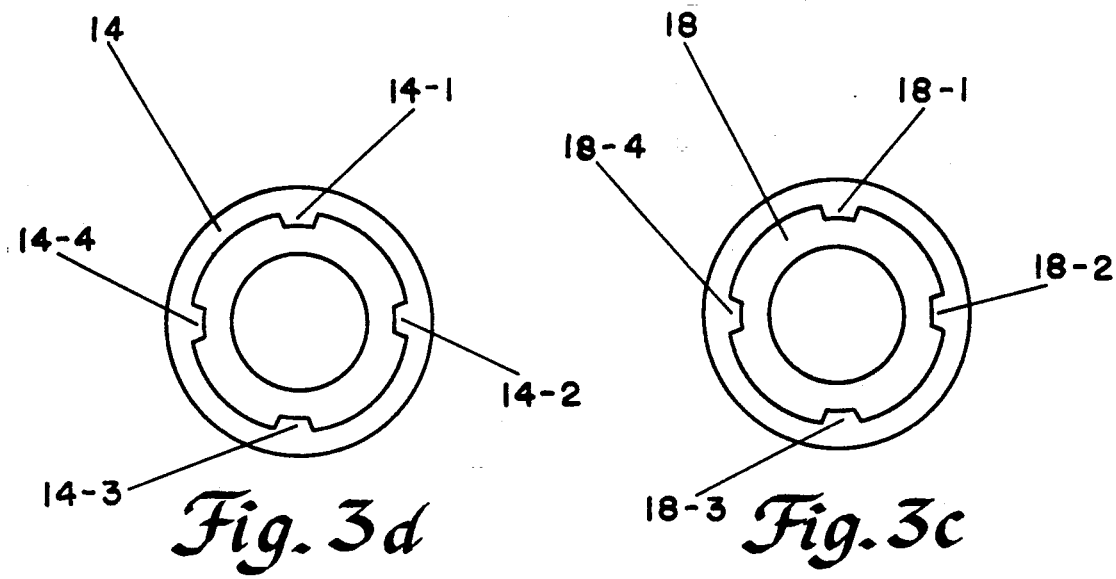
FIGS. 3a-3e show views of further embodiments of a cylindrical link.

Referring to the Figures in which like reference numerals indicate like parts throughout, FIGS. 1a, 1b, and 1c show side, front, and cross-section views, respectively, of a preferred embodiment of a cylindrical link 10 in accordance with the present invention. In this application, it will be understood that by "cylindrical" is meant any substantially axially symmetric form. As shown in the Figures, a cylindrical link 10 in accordance with the present invention has an enlarged end 12, which has an inwardly directed, threaded flange 14, and a reduced end 16, which has an outwardly directed, correspondingly threaded flange 18.

The physical dimensions of the link 10 are most clearly seen in FIG. 1c, and the link's overall length L, enlarged end length EL, outer diameter D, inner diameter d, wall thickness T, and flange thread size are selected according to the characteristics desired of the link and armor. For example, in an armoring application in which electrical cables, hydraulic lines, or fuel lines on military vehicles are to be protected from hazards such as small-arms fire, fragments, or shrapnel, the link's material and wall thickness T are determined by the ballistic threat level, and the other dimensions are determined by the size of the conduit to be protected and the desired minimum bend radius of the cylindrical armor. It has been found that type 4340 alloy steel heat-treated to 55 on the Rockwell "C" scale is a suitable link material.

It will be understood that the link 10 may be fabricated of tough materials such as metals, metal alloys, super alloys, metal-ceramic composites, and fiber-reinforced composite materials according to the hazards identified in the armoring application. In addition, the link 10 may have a hard surface coating such as black oxide to reduce the effects of abrasion and corrosion.

In accordance with another aspect of the present invention, a cylindrical armor is formed from a plurality of links 10, two of which are shown in FIGS. 2a and 2b. The links 10 are identical and easily mass produced, allowing armoring of conduits of any length. As seen in FIG. 2a, the threaded flange on the reduced end 16 of one link 10 may engage the correspondingly threaded flange on the enlarged end 12 of the adjacent link. The links may be maintained so threadedly engaged if a rigid cylindrical armor is desired. When so engaged, the armor is self-supporting, imposing minimal stress on the conduit disposed therethrough.

A flexible cylindrical armor is obtained by rotating the links' flanges past threaded engagement, as shown in FIG. 2b. The links 10 can then move freely with respect to each other within a range determined by the dimensions of the links, as illustrated by the two positions (one in phantom) of the link 10 on the right side of FIG. 2b. Adjacent links are thus retained by channels formed between the reduced end flanges and the enlarged ends, thereby avoiding unintended thread engagement and separation. The telescoping action and flexibility provided by the slidable engagement of the links shown in FIG. 2b are highly advantageous because many conduits to be protected must retain their flexibility. In addition, even when slidably engaged, the links can still support their own weight.

Figures 3A, 3B:
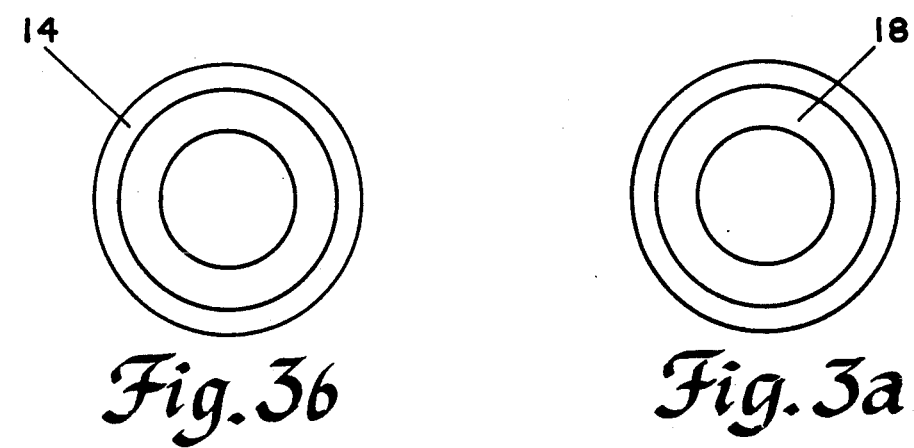
Figure 3E:
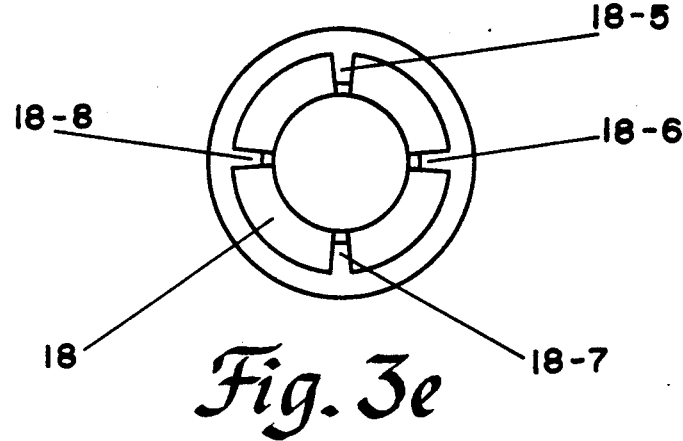

The shape of the flanges on the cylindrical links is not critical to the invention so long as the shape prevents disengagement upon flexing of the armor and allows relative motion of the links. The preferred embodiment, as discussed above, utilizes threading at the ends of the cylindrical links. Other shapes can perform the same function as the threading and still allow the armor to flex. Examples of these additional shapes or engagement mechanisms include: an interference fit between the flange 18 on the reduced end 16 of one link and the flange 14 on the enlarged end 12 of an adjacent link (see FIGS. 3a and 3b) keyed or indexed machinings on adjacent flanges 14 and 18 (see FIGS. 3c and 3d in which four such keys 14-1 to 14-4 and 18-1 to 18-4 are shown): and one or more axial slots in the reduced end 16 and flange 18 by which flange 18 can be temporarily compressed in the radial direction and inserted into the enlarged end of an adjacent link past the adjacent link's flange 14 (see FIG. 3e in which four such slots 18-5 to 18-8 are shown). In the latter embodiment, the axial slots 18-5 to 18-8 need not, as indicated in FIG. 3e, run the whole length of the reduced end 16. In addition, the outer edges of flange 18 may be axially tapered to facilitate insertion of flange 18 into and through flange 14 of an adjacent link.

Figure 4:
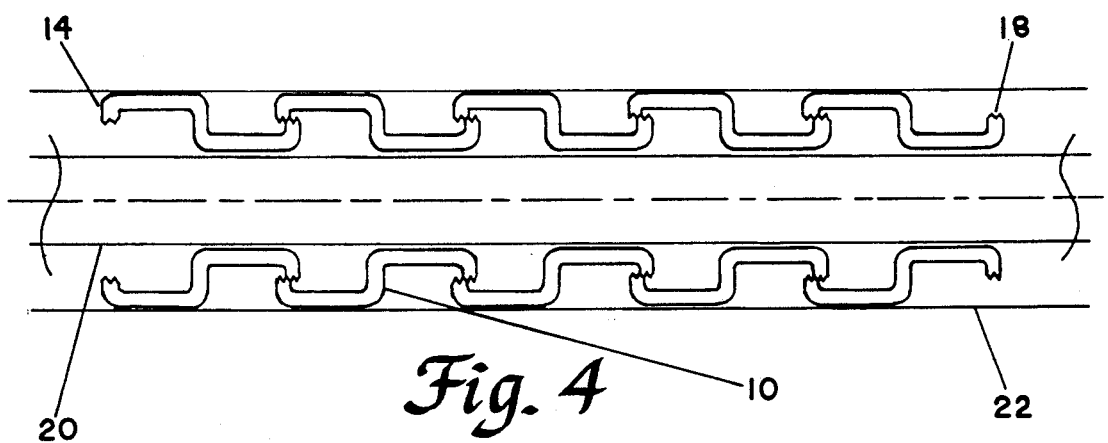
FIG. 4 shows a section view of a rigid cylindrical armor.

Referring now to FIG. 4 which shows a cross-section of a rigid cylindrical armor comprising a plurality of cylindrical links 10 threadedly engaged, it can be seen that a long "chain" of links 10 can be assembled to protect a conduit 20 disposed therethrough. The "chain" may be readily slid over conduit 20 or assembled one link at a time. In addition, an outer sheath 22 such as a thermoplastic material like polyvinyl chloride, heat shrinkable tubing, etc. may be provided as an environmental seal and to resist disengagement of the threadedly engaged links 10. It will be appreciated that the threaded flanges 14, 18 on the extreme ones of the plurality of links 10 can engage correspondingly threaded fittings in rigid structures joined by conduit 20, thereby supporting the weight of the armor at both of its ends. Furthermore, the extreme ones of the links may have some dimensions different from the majority of the other links so that any end fittings or connectors on conduit 20 can be protected by inclusion within the cylindrical armor.

Figure 5:
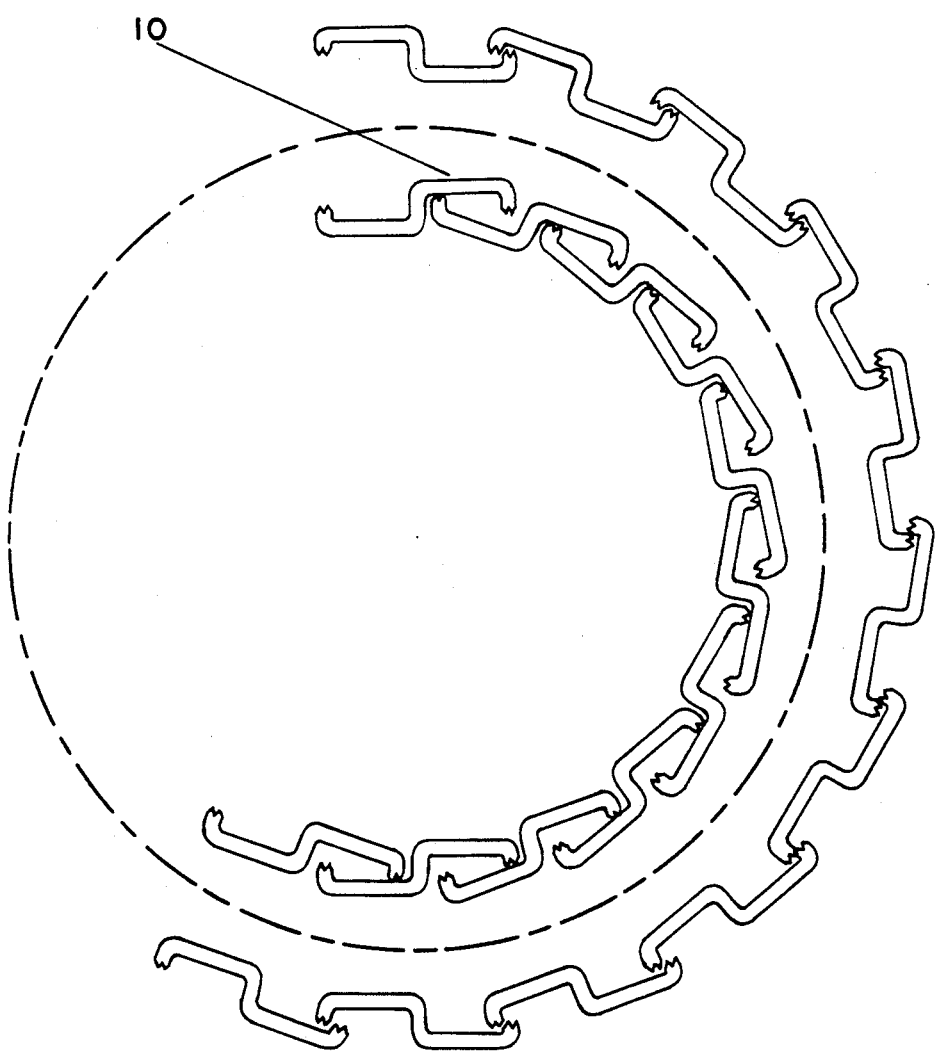
FIG. 5 shows a section view of a flexible cylindrical armor.

It will be understood that the form and dimensions of the links affect the degree of flexibility achievable with an armor in accordance with the present invention. As shown in FIG. 5, the minimum bend radius R of a flexible cylindrical armor is related to the overall length and other dimensions of the slidably engaged links 10. The minimum bend radius increases with both wall thickness and link diameter, and lower values of the ratio L/D result in smaller bend radii. For maximal flexibility, the ratio L/D should be approximately unity and EL/L should be approximately one-half.

An armor in accordance with the present invention can be easily repaired by replacing each of any damaged links rather than all. Each damaged link is disengaged from its adjacent links, taking advantage of the telescopic ability of the links, then cut along the link axis and removed. The remaining links can then be engaged, either threadedly or slidably, and a new link or links added to an extreme end of the armor. Furthermore, access to the fittings or connectors on the conduit being protected is also facilitated by the telescopic ability of the links.

The foregoing description is intended in all respects to be illustrative rather than restrictive. Those of ordinary skill in the art will recognize modifications which do not depart from and are intended to be included in the spirit and scope of the present invention that is to be delimited solely by the appended claims.

What is claimed is:

1. A cylindrical armor for protecting a conduit disposed therethrough comprising:
   a plurality of cylindrical links, each cylindrical link having a reduced end and an enlarged end, the ends being shaped for engagement with the ends of adjacent identical cylindrical links, wherein the ends of each link comprise means for selectively making said engagement between each pair of adjacent identical cylindrical links either rigid or slidable and flexible without disassembling the cylindrical armor, the links of each pair remaining interconnected in both the rigid and the slidable and flexible configurations, the links also remaining interconnected as the engagement is converted from either configuration to the other configuration, wherein the means for selectively making said engagement either rigid or slidable and flexible includes flanges which are correspondingly threaded, and wherein the engagement between adjacent links is rigid when the adjacent links are threadedly engaged and slidable and flexible when the links' flanges are rotated past threaded engagement.

2. The cylindrical armor of claim 1, wherein the enlarged ends have inner diameters measured inwardly of the enlarged ends' flanges that exceed the diameters of the enlarged ends' flanges for reducing a probability of accidental disengagement of slidably engaged links.

3. The cylindrical armor of claim 1, further comprising two extreme cylindrical links, each extreme cylindrical link having one of a modified reduced end and a modified enlarged end for engaging corresponding fittings in a structure to support the armor's weight and having one of an enlarged end and a reduced end for engaging adjacent ones of a plurality of cylindrical links.

4. A cylindrical armor for protecting a conduit disposed therethrough comprising:
   a plurality of identical cylindrical links, each link having a reduced end, the reduced end having a threaded flange, and an enlarged end, the enlarged end having a correspondingly threaded flange, the reduced end of each link engaging the enlarged end of an adjacent link, wherein the engagement between each pair of identical adjacent cylindrical links being selectively made either rigid or slidable, telescopic and flexible by rotating one member of the threaded pair of adjacent links with respect to the other member such that when the threaded portions are engaged, the links of each pair are interconnected in the rigid configuration, and when the threaded portions are disengaged, the links of each pair remain interconnected in the slidable, telescopic and flexible configuration.

5. The cylindrical armor of claim 4, wherein the links' material is selected from at least one of a metal, a metal alloy, a super alloy, a metal-ceramic composite, and a fiber-reinforced composite in accordance with a ballistic threat level.

6. The cylindrical armor of claim 4, wherein the plurality of cylindrical links has a first link and a last link, and each of the first link and the last link has one of a modified reduced end and a modified enlarged end for engaging corresponding fittings in a structure to support the armor's weight.

7. The cylindrical armor of claim 4, wherein the outer diameter of the enlarged end is approximately equal to the overall length of each link, and the ratio of the length of the enlarged end to the outer diameter of the enlarged end is approximately one-half.

8. A cylindrical link for protecting a conduit disposed therethrough comprising:
   an enlarged end having a threaded flange; and
   a reduced end having a correspondingly threaded flange;
   wherein the ends include means for engaging an end of an identical adjacent link, the engagement being selectively made either rigid or slidable, telescopic and flexible by rotating the link with respect to the adjacent link such that when the threaded portions are engaged, the links of each pair are interconnected in the rigid configuration, and when the threaded portions are disengaged, the links of each pair remain interconnected in the slidable, telescopic and flexible configuration.

9. The cylindrical armor according to claims 1, 4, 6 or 7, wherein the threaded flange on the reduced end is outwardly directed, and the threaded flange on the enlarged end is inwardly directed.

10. A cylindrical armor for protecting a conduit disposed therethrough comprising:
    a plurality of cylindrical links, each link having a reduced end and an enlarged end, the ends being shaped for selective engagement with the ends of adjacent links, wherein the engagement between each pair of adjacent links is selectively made either rigid or slidable, wherein the ends include flanges which are correspondingly threaded, wherein the threaded flange on the reduced end is outwardly directed and the threaded flange on the enlarged end is inwardly directed, wherein the engagement between adjacent links is rigid when the adjacent links are threadedly engaged and slidable when the links' flanges are rotated past threaded engagement, and wherein the links are interconnected in both the rigid and slidable configurations.

11. A cylindrical armor for protecting a conduit disposed therethrough comprising:
    a plurality of cylindrical links, each link having a reduced end, the reduced end having a threaded flange, and an enlarged end, the enlarged end having a correspondingly threaded flange, the reduced end of each link engaging the enlarged end of the adjacent link,
    wherein the threaded flange on the reduced end is outwardly directed, and the threaded flange on the enlarged end is inwardly directed,
    wherein the engagement between each pair of adjacent links is selectively made either rigid or slidable and flexible,
    wherein the engagement between adjacent links is rigid when the adjacent links are threadedly engaged and slidable and flexible when the links' flange are rotated past threaded engagement, and
    wherein the links are interconnected in both the rigid and slidable configurations.

12. The cylindrical armor of claim 11, wherein the plurality of cylindrical links has a first link and a last link, and each of the first link and the last link has one of a modified reduced end and a modified enlarged end for engaging corresponding fittings in a structure to support the armor's weight.

13. The cylindrical armor of claim 11, wherein the outer diameter of the enlarged end is approximately equal to the overall length of each link, and the ratio of the length of the enlarged end to the other diameter of the enlarged end is approximately one-half.

* * * * *